(12) United States Patent
Hrbek

(10) Patent No.: US 10,293,722 B1
(45) Date of Patent: May 21, 2019

(54) SEAT COVER

(71) Applicant: Benjamin H. T. Hrbek, Bend, OR (US)

(72) Inventor: Benjamin H. T. Hrbek, Bend, OR (US)

( * ) Notice: Subject to any disclaimer, the term of this patent is extended or adjusted under 35 U.S.C. 154(b) by 0 days.

(21) Appl. No.: 15/853,059

(22) Filed: Dec. 22, 2017

Related U.S. Application Data

(60) Provisional application No. 62/437,894, filed on Dec. 22, 2016.

(51) Int. Cl.
| | | |
|---|---|---|
| *A47C 31/11* | (2006.01) | |
| *A47C 7/62* | (2006.01) | |
| *B60N 2/58* | (2006.01) | |
| *B60N 2/60* | (2006.01) | |

(52) U.S. Cl.
CPC .......... *B60N 2/5858* (2013.01); *B60N 2/6063* (2013.01)

(58) Field of Classification Search
CPC .............................. B60N 2/5858; B60N 2/6063
USPC ............................................... 297/219.1–229
See application file for complete search history.

(56) References Cited

U.S. PATENT DOCUMENTS

| | | |
|---|---|---|
| 434,753 A | 8/1890 | Barrows |
| 2,204,449 A | 6/1940 | Gordon |
| 4,362,334 A | 12/1982 | Ross et al. |
| 5,241,706 A | 9/1993 | Netz |
| 5,326,152 A | 7/1994 | Baron |
| 5,584,422 A | 12/1996 | Bond-Madsen |
| 5,624,157 A | 4/1997 | Kostuk |
| 5,690,380 A * | 11/1997 | Waters ................... A47C 31/11 297/228.11 X |
| 5,806,925 A * | 9/1998 | Hanley ................ A47C 31/113 297/228.11 X |
| 6,067,777 A * | 5/2000 | Stoll ..................... B60N 2/6063 297/228.1 X |
| 6,131,995 A * | 10/2000 | Smith ................... B60N 2/6063 297/229 X |
| 6,345,866 B1* | 2/2002 | Jackson ................. A47C 31/11 297/229 X |
| 7,172,246 B1* | 2/2007 | Itakura ................. A47C 31/116 297/219.1 |
| 7,618,092 B2* | 11/2009 | Yasuda ................ B60N 2/5816 297/228.11 X |
| 7,695,066 B2* | 4/2010 | Guercia ................. A47C 31/11 297/228.11 X |
| 7,841,658 B1* | 11/2010 | Marble .................... B60N 2/60 297/228.11 X |

(Continued)

*Primary Examiner* — Rodney B White
(74) *Attorney, Agent, or Firm* — Cramer Patent & Design, PLLC; Aaron R. Cramer

(57) ABSTRACT

A seat cover that includes a lower seat panel for covering a seat cushion. The lower seat panel includes both a front storage pocket and a first elastic edging for attaching the lower seat panel to the seat cushion. A seat back panel covers a seat back. The seat back panel includes a second elastic edging around its outer perimeter for attaching the seat back panel to the seat back. A transition panel having a third elastic edging around its outer perimeter for selectively attaching the transition panel to the seat back, and a fourth elastic edging within the third elastic edging for selectively attaching the transition panel to the seat cushion. The transition panel includes two (2) surfaces which selectively become exposed to provide clean seating surfaces.

20 Claims, 4 Drawing Sheets

(56) References Cited

U.S. PATENT DOCUMENTS

| | | | | |
|---|---|---|---|---|
| 2002/0185898 A1* | 12/2002 | Smith | A47C 31/11 | 297/224 |
| 2007/0262624 A1* | 11/2007 | Snedeker | A47C 31/11 | 297/219.1 |
| 2008/0061610 A1* | 3/2008 | Tache | A47C 31/00 | 297/219.1 |
| 2009/0322129 A1 | 12/2009 | Rodill et al. | | |
| 2011/0049951 A1* | 3/2011 | Bettencourt | A47C 31/11 | 297/229 |
| 2012/0074745 A1* | 3/2012 | Paulin | A47B 13/083 | 297/229 |
| 2013/0187415 A1* | 7/2013 | Shelley | A47C 31/11 | 297/228.11 X |
| 2015/0061335 A1* | 3/2015 | Chapman | B60N 2/6018 | 297/219.1 X |
| 2015/0102645 A1* | 4/2015 | Rogan | A47C 31/11 | 297/228.11 |
| 2016/0022054 A1* | 1/2016 | Griffin | A47C 31/11 | 297/228.11 |
| 2017/0253159 A1* | 9/2017 | Lopatin | B60N 2/6063 | |
| 2018/0304784 A1* | 10/2018 | Ricks | B60N 2/6063 | |

\* cited by examiner

SEAT COVER

RELATED APPLICATIONS

The present invention is a continuation of, was first described in and claims the benefit of U.S. Provisional Application No. 62/437,894 filed Dec. 22, 2016, the entire disclosures of which are incorporated herein by reference.

FIELD OF THE INVENTION

The presently disclosed subject matter is directed to vehicle seat covers.

BACKGROUND OF THE INVENTION

Cars, trucks and other vehicles often represent a major investment for their owners. The cost of buying and operating such vehicles can often be the largest single daily expense of an owner. However, cars and trucks have proven to be a necessity in modern American life. They provide safe, convenient transportation, move goods, and provide status symbols. Because of their necessity and the resources invested in them many people go to great lengths to protect their vehicles.

While protecting the outside of a vehicle using bed liners, high quality paints and protective coatings, protecting a vehicle's interior is at least as important. To protect their vehicle's interior many people turn to the use of vehicle seat covers to help keep their vehicle's interior looking its best.

Seat covers have proven themselves useful for preventing dirt and stains from permanently damaging vehicle seats as well as protecting against wear and tear. So not only do vehicle seat covers provide improved aesthetics but they also help ensure the maximum resale value of their vehicle.

While seat covers are widely used they do have their limitations. For example, some people work in professions in which they become sweaty, dirty and generally grimy over the course of a day's work. Such professions include mechanics, gardeners, painters and the like. Of course, any dirt, grease, grime or stains on their clothing will transfer to their vehicle's seat covers. Unfortunately, if a vehicle has to be used for personal business the dirt, grease, and stains on their vehicle's seat covers tend to transfer onto the owner's clean clothing.

One (1) approach to protecting an owner from dirty seat covers is to remove those seat covers and either machine or hand wash the seat covers, dry them, and then re-install them back on a vehicle's seat. While this approach is highly effective, the steps of removing, cleaning, drying, and re-installing seat covers is time consuming and exposes both the seat cover itself and the seat to possible damage.

While cleaning an existing seat cover can be beneficial it is not at all helpful when one has to quickly change from dirty clothes to clean clothes and then to drive away. Therefore, a need exists for vehicle seat covers that can protect vehicle seats from extremely dirty clothes while enabling a user to sit on a vehicle's seat with clean clothes without transferring dirt or stains from the seat covers to the clean clothes. Beneficially such seat covers would be easy to use, quick to install, and would be suitable for being made available at relatively low cost.

SUMMARY OF THE INVENTION

The principles of the present invention provide for vehicle seat covers that can protect a vehicle's seats from dirt and grime while enabling a user to sit on the vehicle's seat with clean clothes without transferring dirt or stains from the seat covers to the clean clothes. Such seat covers are easy to use, quick to install, and are suitable for being made available at relatively low cost.

A seat cover that is in accord with the present invention includes a lower seat panel for covering a seat cushion. The lower seat panel includes both a front storage pocket and a first elastic edging for attaching the lower seat panel to the seat cushion. Also included is a seat back panel that is configured to cover a seat back. The seat back panel includes a second elastic edging around its outer perimeter for attaching the seat back panel to the seat back. The seat cover further includes a transition panel having a third elastic edging around its outer perimeter for selectively attaching the transition panel to the seat back, and a fourth elastic edging within the third elastic edging for selectively attaching the transition panel to the seat cushion. The transition panel includes a back surface for contacting the seat back panel when the transition panel is attached to a seat back. The back surface becomes exposed when the transition panel is attached to the seat cushion.

Beneficially the seat back panel is attached to the lower seat panel. Preferably the seat back panel and the lower seat panel are manufactured as a one-piece unit. The transition panel is beneficially rotatably attached to the seat back panel. The transition panel may include a perimeter area between the third elastic edging and the fourth elastic edging. In addition, the fourth elastic edging can be "U" shaped. In practice the perimeter area fits into the storage pocket while the lower seat panel is comprised of a textile material.

An alternative seat cover that is in accord with the present invention includes a lower seat panel for covering a seat cushion. That lower seat panel includes a front storage pocket and a first elastic edging for attaching the lower seat panel to the seat cushion. Also included is a seat back panel that is configured to cover a seat back. The seat back panel includes a second elastic edging around its outer perimeter for attaching the seat back panel to the seat back. The seat cover further includes a transition panel having a third elastic edging around its outer perimeter for selectively attaching the transition panel to the seat back and a fourth elastic edging within the third elastic edging for selectively attaching the transition panel to the seat cushion. The transition panel includes an exposed front surface when the transition panel is attached to a seat back and an exposed back surface when the transition panel is attached to the seat cushion.

In practice the seat back panel and the lower seat panel are a single piece unit while the transition panel is rotatably attached to the seat back panel. The transition panel preferably includes a perimeter area that is located between the third elastic edging and the fourth elastic edging. The fourth elastic edging should be "U"-shaped. In any event the perimeter area fits into the storage pocket. The lower seat panel is preferably comprised of a textile material.

Another seat cover that is in accord with the present invention includes a lower seat panel for covering a seat cushion. That lower seat panel includes a front storage pocket and a first elastic edging for attaching the lower seat panel to the seat cushion. Also included is a seat back panel that is integrally manufactured as one piece with the seat back. The seat back panel includes a second elastic edging around its outer perimeter for attaching the seat back panel to the seat back. The seat cover further includes a transition panel having a third elastic edging around its outer perimeter for selectively attaching the transition panel to the seat back and a fourth elastic edging within the third elastic edging for selectively attaching the transition panel to the seat cushion. The transition panel includes an exposed front surface when the transition panel is attached to a seat back and an exposed back surface when the transition panel is attached to the seat cushion.

In practice the transition panel is rotatably attached to the seat back panel. The transition panel preferably includes a perimeter area that is located between the third elastic edging and the fourth elastic edging. The fourth elastic edging should be "U"-shaped. In any event the perimeter area fits into the storage pocket. The lower seat panel is preferably comprised of a textile material.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
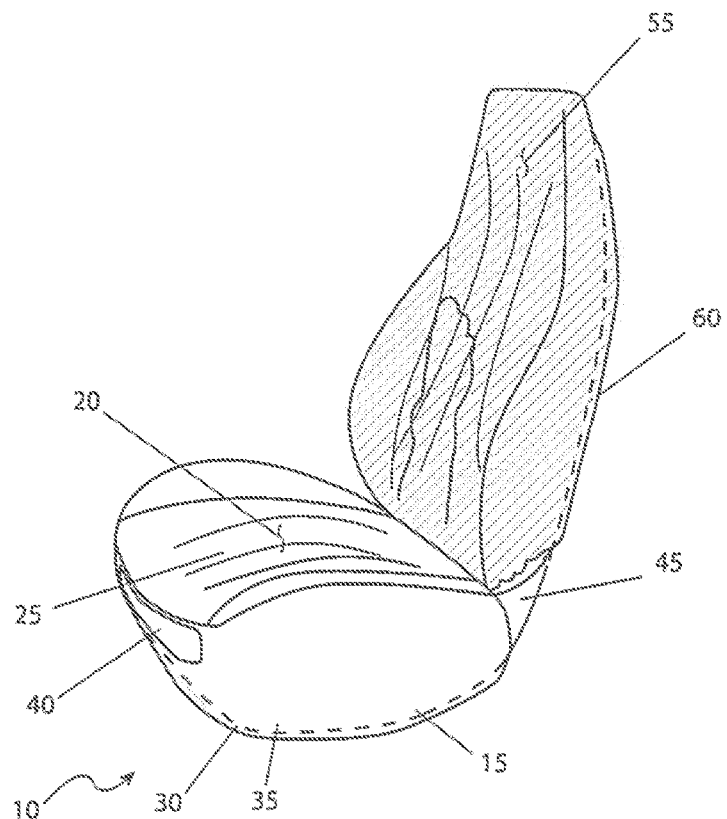
FIG. 1 is an isometric view of a seat cover 10 that is in accord with the principles of the present invention when deployed in a first configuration upon a vehicle's seat 15 such that the seat 15 is fully protected from dirt and grime.

DESCRIPTIVE KEY 10 seat cover
15 vehicle seat
20 lower seat panel
25 seat cushion
30 first elastic edging
35 contour
40 storage pocket
45 seat back
50 seat back panel
55 transition panel
60 second elastic edging
63 transition panel back surface
65 third elastic edging
70 travel path "t"
75 perimeter area
80 inner area
85 fourth elastic edging
90 back panel surface
95 transition panel front surface

DETAILED DESCRIPTION OF THE PREFERRED EMBODIMENT

The preferred embodiment of the present invention is depicted in FIGS. 1 through 4. However, the invention is not limited to the specifically described embodiment. A person skilled in the art will appreciate that many other embodiments of the invention are possible without deviating from the basic concept of the invention. Any such work around will also fall under the scope of this invention.

The terms "a" and "an" as used herein do not denote a limitation of quantity, but rather denote the presence of at least one of the referenced items. In addition all reference designations such as front, top, bottom, back, left and right, are taken with respect to FIG. 1. This understanding is important as the inventive seat cover 10 takes multiple configurations in which a transition panel acts as a seat back cover in one configuration and is then folded down to become a seat cover in which a once outwardly facing surface then faces downward.

Figure 4:
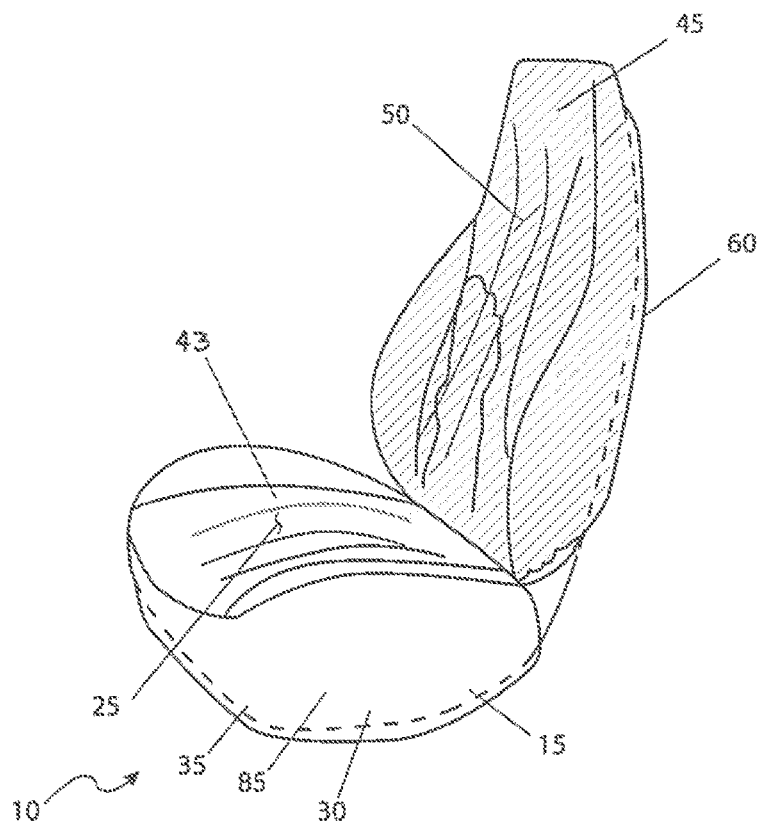

Refer now to FIG. 1 and FIG. 4 for isometric views of a seat cover 10 that is in accord with the principles of the present invention. FIG. 1 shows the seat cover 10 installed upon a vehicle's seat 15 in what is referred to hereinafter as the first configuration. FIG. 4 shows the seat cover 10 installed upon the seat 15 in what is referred to hereinafter as the second configuration. The seat 15 is depicted as a "bucket" seat as is commonly found in automobiles and trucks. However, the teachings of the present invention are in general applicable to other types of seats. As such, the depiction of the particular seat 15 for which the seat cover 10 is being used is not intended to be a limiting factor of the present invention unless so restricted by one or more of the attached claims.

The seat cover 10 includes a lower seat panel 20 (shown in FIGS. 1 and 2) that always covers the vehicle's seat cushion 25 and a seat back panel 50 (shown in FIGS. 2 and 4) that always covers the seat back 45. Also included is a transition panel 55 (best shown in FIGS. 1 and 2) that transitions between covering the lower seat panel 20/seat cushion 25 and covering the seat back panel 50/seat back 45. In practice the lower seat panel 20 and the seat back panel 50 are a one-piece structure while the transition panel 55 is rotatably attached (such as by sewing) to that one-piece structure.

Turning to FIG. 1, the lower seat panel 20 includes a first elastic edging 30 that grips the bottom contours 35 of the seat cushion 25. The lower seat panel 20 also includes a storage pocket 40 that extends along the bottom of the lower seat panel 20. The purpose of the storage pocket 40 is described in greater detail subsequently. Except for elastic edgings (30, 60, 65, and 85) the lower seat panel 20, as well as the remainder of the seat cover 10, is comprised of a textile material such as, but not limited to: nylon, canvas, vinyl, wood fiber based, cotton, denim, or the like.

In addition to the seat cushion 25 the vehicle seat 15 also includes a seat back 45. In the first configuration shown in FIG. 1 the front of the seat back 45 is covered and protected by both the seat back panel 50 (hidden in FIG. 1 due to illustrative limitations, but see FIG. 2 and FIG. 4) and by the transition panel 55. In that configuration the transition panel 55 has an exposed transition panel front surface 95 (see FIG. 3) and, opposite the transition panel front surface 95, a transition panel back surface 63 that is in contact with the seat back panel 50. The transition panel back surface 63 becomes exposed when the seat cover 10 is installed in the second configuration (see FIG. 4). To clarify the foregoing with respect to the drawings, the transition panel front surface 95 and the transition panel back surface 63 includes the perimeter area 75 and the inner area 80.

In the first configuration the seat back panel 50 is attached to the seat back 45 via a second elastic edging 60. In addition, the transition panel 55 is attached to the seat back 45 over the seat back panel 50 using a third elastic edging 65. It is envisioned that the seat cover 10 would be made available as a form-fitting structure available in different sizes and shapes as required to properly fit vehicle seats 15 from different motor vehicle manufacturers.

Figure 2:
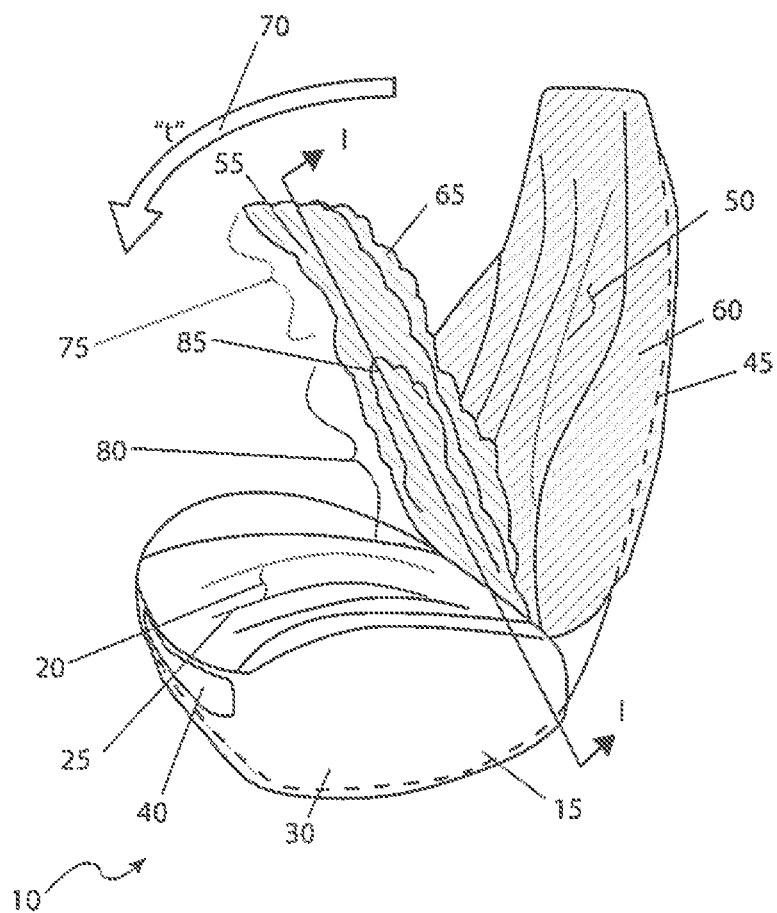
FIG. 2 is an isometric view of the seat cover 10 of FIG. 1 being switched from a first configuration to a second configuration.

Refer next to FIG. 2 for an isometric view of the seat cover 10 as the transition panel 55 is being moved from the first configuration to the second configuration. Significant changes include that the seat back panel 50 and the transition panel back surface 63 both become exposed as the transition panel 55 folds over the lower seat panel 20/seat cushion 25. The resulting configuration is highly beneficial as the transition panel front surface 95, which may be dirty and grimy, folds over the surface of the lower seat panel 20, which also may also be dirty and grimy. A user can then sit on the clean transition panel back surface 63 and on the clean seat back panel 50 (see FIG. 4).

As shown in FIG. 2 the lower seat panel 20 still covers the seat cushion 25 and remains secured in place by the first elastic edging 30. The seat back panel 50 still covers the seat back 45 and remains secured in place by the second elastic edging 60. The transition panel 55 is detached from the seat back 45 by removal of the third elastic edging 65. The transition panel 55 is then moved from the seat back 45 onto the seat cushion 25 along travel path "t" 70.

After the transition panel 55 is placed over the seat cushion 25 the perimeter area 75 of the transition panel 55 (shown in FIG. 3) is "stuffed" into the storage pocket 40. The inner area 80 of the transition panel 55 (the part of the transition panel 55 that remains after the perimeter area 75 is stuffed into the storage pocket 40) functions as a cover for the seat cushion 25 with its transition panel back surface 63 being exposed. To that end a fourth elastic edging 85, which also helps define the inner area 80, is used to attach the inner area 80 to the seat cushion 25.

It should be noted that the third elastic edging 65 and the fourth elastic edging 85 both have a "U"-shape, and that the fourth elastic edging 85 is located interior of the third elastic edging 65. It also should be noted that the seat cover 10 can be completely removed and, if desired machine or hand washed and then dried.

Figure 3:
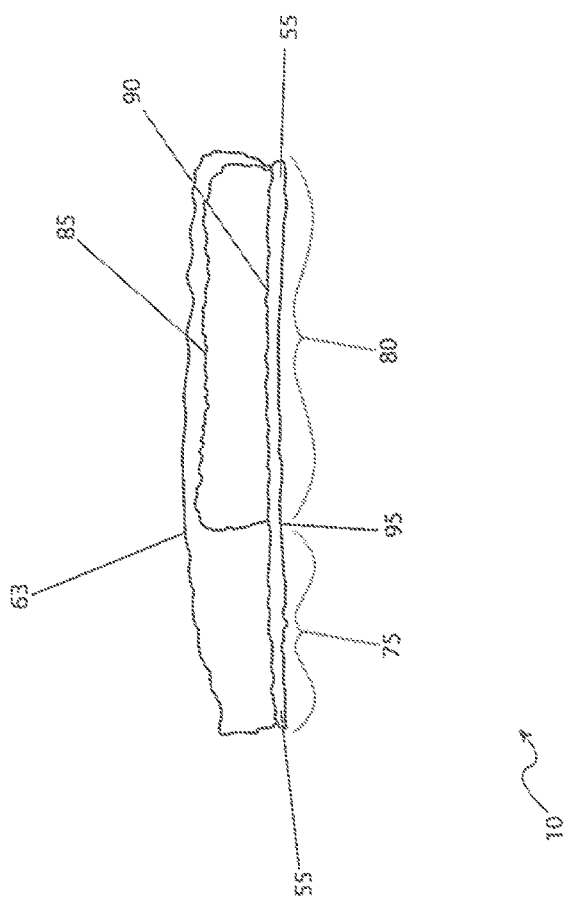
FIG. 3 is a sectional view of the seat cover 10 taken along section line I-I of FIG. 2; and, FIG. 4 is an isometric view of the seat cover 10 when deployed in the second configuration upon a vehicle's seat 15.

FIG. 3 presents a sectional view of the seat cover 10 taken along sectional line I-I FIG. 2. The perimeter area 75 and the inner area 80 serve as a seat cover for the seat back 45 when the seat cover 10 is utilized as shown in FIG. 1. Alternatively, the seat cover 10 can be used such that the perimeter area 75 and its associated third elastic edging 65 are folded and placed into the storage pocket 40 (as shown in FIG. 1 and FIG. 2) while the inner area 80 covers the seat cushion 25 and the lower seat panel 20. The fourth elastic edging 85 is pulled up and over the third elastic edging 65 and is secured to the contours 35 (see in FIG. 1). As such, the transition panel 55 provides a dual use; as a protector for the seat back 45 or as a protector for the seat cushion 25.

FIG. 4 shows an isometric view of the seat cover 10 installed upon a vehicle seat 15 in the second configuration. The transition panel back surface 63 is exposed while covering the seat cushion 25 and is secured in place by the fourth elastic edging 85 which is placed over the first elastic edging 30 on the contours 35. This configuration provides a seat cover that still protects the vehicle seat 15 while providing two (2) clean seating surfaces for a user.

The preferred embodiment of the present invention can be utilized by the common user in a simple and effortless manner with little or no training. It is envisioned that the seat cover 10 would be constructed in general accordance with FIG. 1 through FIG. 4. A user would manufacture or procure a seat cover 10 having the proper dimensions to fit the vehicle seat 15 upon which it is to be used. Installing the seat cover 10 on the vehicle seat 15 would commence by initially placing the lower seat panel 20 upon the seat cushion 25 while simultaneously placing the seat back panel 50 upon the seat back 45. Next, the first elastic edging 30 is stretched and secured around the contours 35 such that it holds the lower seat panel 20 in place by forces induced by the first elastic edging 30. Then, the user would stretch the second elastic edging 60 and secure it around the seat back 45. At this time the seat cover 10 is secured to the vehicle seat 15 with the transition panel 50 remaining to be secured.

Next, the transition panel 50 would be attached to the seat back 45 with both its perimeter area 75 and its inner area 80 being exposed along with the transition panel front surface 95. Attachment would be obtained by using the third elastic edging 65. At this time the seat cover 10 is prepared for its first use as a cover to protect the seat 20 from dirt.

When clean seating surfaces are desired the third elastic edging 65 is released from the seat back 45. Next, the transition panel 50 is folded down while the perimeter area 75 is rolled and placed within the storage pocket 40. The third elastic edging 65 is left to hang from the sides of the seat cushion 25. The fourth elastic edging 85 is then stretched and secured around and over the third elastic edging 65 and affixed to the contours 35. At this time the seat cover 10 is prepared for its use as a seating surface to protect clean clothes from dirt left on the seat cover 10.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A seat cover for a vehicle seat having a bottom cushion and a seat back, comprising:
   a lower seat panel for covering the seat cushion, said lower seat panel having a front storage pocket and a first elastic edging for attaching said lower seat panel to the seat cushion;
   a seat back panel configured to cover a seat back, said seat back panel including a second elastic edging around its outer perimeter for attaching said seat back panel to the seat back; and,
   a transition panel having a third elastic edging around its outer perimeter for selectively attaching said transition panel to the seat back and a fourth elastic edging within said third elastic edging for selectively attaching said transition panel to the seat cushion, wherein said transition panel includes a back surface for contacting said seat back panel when said transition panel is attached to a seat back, and wherein said back surface is exposed when said transition panel is attached to said seat cushion.

2. The seat cover according to claim 1, wherein said seat back panel is attached to said lower seat panel.

3. The seat cover according to claim 2, wherein said seat back panel and said lower seat panel are manufactured as a single piece unit.

4. The seat cover according to claim 2, wherein said transition panel is rotatably attached to said seat back panel.

5. The seat cover according to claim 1, wherein said transition panel includes a perimeter area between said third elastic edging and said fourth elastic edging.

6. The seat cover according to claim 5, wherein said fourth elastic edging is U-shaped.

7. The seat cover according to claim 5, wherein said perimeter area fits into said storage pocket.

8. The seat cover according to claim 1, wherein said lower seat panel is comprised of a textile material.

9. A seat cover for a vehicle seat having a bottom cushion and a seat back, comprising:
  a lower seat panel for covering a seat cushion, said lower seat panel having a front storage pocket and a first elastic edging for attaching said lower seat panel to a seat cushion;
  a seat back panel attached to said lower seat panel and configured to cover the front of a seat back, said seat back panel including a second elastic edging around its outer perimeter for attaching said seat back panel to a seat back; and,
  a transition panel having a third elastic edging around its outer perimeter for selectively attaching said transition panel to a seat back and a fourth elastic edging within said third elastic edging for selectively attaching said transition panel to a seat cushion, wherein said transition panel includes an exposed front surface when said transition panel is attached to a seat back, and wherein said transition panel has an exposed back surface when said transition panel is attached to said seat cushion.

10. The seat cover according to claim 9, wherein said seat back panel and said lower seat panel are a single piece unit.

11. The seat cover according to claim 10, wherein said transition panel is rotatably attached to said seat back panel.

12. The seat cover according to claim 9, wherein said transition panel includes a perimeter area located between said third elastic edging and said fourth elastic edging.

13. The seat cover according to claim 12, wherein said fourth elastic edging is U-shaped.

14. The seat cover according to claim 12, wherein said perimeter area fits into said storage pocket.

15. The seat cover according to claim 9, wherein said lower seat panel is comprised of a textile material.

16. A seat cover for a vehicle seat having a bottom cushion and a seat back, comprising:
  a lower seat panel for covering a seat cushion, said lower seat panel having a front storage pocket and a first elastic edging for attaching said lower seat panel to a seat cushion;
  a seat back panel integrally formed with said lower seat panel, said seat back panel configured to cover the front of a seat back, said seat back panel including a second elastic edging around its outer perimeter for attaching said seat back panel to a seat back; and,
  a transition panel having a third elastic edging around its outer perimeter for selectively attaching said transition panel to a seat back and a fourth elastic edging within said third elastic edging for selectively attaching said transition panel to a seat cushion, wherein said transition panel includes an exposed front surface when said transition panel is attached to a seat back, and wherein said transition panel has an exposed back surface when said transition panel is attached to said seat cushion.

17. The seat cover according to claim 16, wherein said transition panel is rotatably attached to said seat back panel.

18. The seat cover according to claim 17, wherein said transition panel includes a perimeter area located between said third elastic edging and said fourth elastic edging.

19. The seat cover according to claim 18, wherein said fourth elastic edging is U-shaped.

20. The seat cover according to claim 19, wherein said perimeter area fits into said storage pocket.

* * * * *